United States Patent [19]

Ikehira

[11] Patent Number: 5,093,653
[45] Date of Patent: Mar. 3, 1992

[54] IMAGE PROCESSING SYSTEM HAVING SKEW CORRECTING MEANS

[75] Inventor: Kimimasa Ikehira, Hadano, Japan
[73] Assignee: Ricoh Company, Ltd., Japan
[21] Appl. No.: 431,932
[22] Filed: Nov. 6, 1989

[30] Foreign Application Priority Data

Nov. 10, 1988 [JP] Japan .................... 63-284399

[51] Int. Cl.⁵ .............................................. G09G 1/06
[52] U.S. Cl. ............................ 340/727; 340/724; 358/488; 382/46; 382/44
[58] Field of Search ............ 340/724, 727, 710, 750, 340/735, 706; 382/44, 46, 61; 358/488

[56] References Cited

U.S. PATENT DOCUMENTS

| | | | |
|---|---|---|---|
| 4,611,232 | 9/1986 | Searby | 382/46 |
| 4,748,676 | 5/1988 | Miyagawa et al. | 340/727 |
| 4,941,189 | 7/1990 | Britt | 382/46 |

FOREIGN PATENT DOCUMENTS 60-110080 6/1985 Japan .

Primary Examiner—Alvin E. Oberley
Assistant Examiner—Chanh Nguyen
Attorney, Agent, or Firm—Mason, Fenwick & Lawrence

[57] ABSTRACT

An image processing system comprises a memory for storing an input image data in a bit map, a display coupled to the memory for displaying an image which is described by the input image data, an input device for inputting a point data for designating a straight line as a reference line in the image which is displayed on the display, a calculation part coupled to the input device for calculating an inclination angle of the reference line with respect to an axis of a rectangular coordinate of the bit map, and a rotation part coupled to the calculation part for rotating the input image data stored in the memory in the bit map so that the inclination angle becomes approximately zero.

16 Claims, 18 Drawing Sheets

IMAGE PROCESSING SYSTEM HAVING SKEW CORRECTING MEANS

BACKGROUND OF THE INVENTION

The present invention generally relates to generally relates to image processing systems, and more particularly to an image processing system such as an image filing system, a desk top publishing system and a facsimile machine and is capable of correcting an inclination or skew of an image which is input from an image scanner, an optical disk or the like.

When inputting an image to an image processing system such as an image filing system and a desk top publishing system, the image is read from a recording medium such as an optical disk which is prerecorded with the image or the image is read by a an image scanner which scans a document. For example, when the document is set obliquely to the image scanner or the image is copied with an inclination on the document itself, the image is input to the image processing system in the inclined state. As a result, when the input image is displayed on a display or printed on a printer, the displayed or printed image looks poor.

Conventionally, there are various methods of correcting the inclination of the input image. According to one method, an operator monitors the image which is displayed on the display of the image processing system and makes an eye measurement of the inclination of the image. Then, the operator inputs numerical data on the inclination angle by use of a keyboard or a pointing device which will hereinafter be referred to as a mouse. The entire image is rotated for a rotation angle which is equal to the inclination angle by a rotation operation so as to correct the inclination of the image. On the other hand, according to another method, a rotation angle for one rotation operation is fixed and the operator instructs an arbitrary number of rotation operations from the keyboard or mouse while monitoring the image on the display.

But according to these methods, the inclination angle of the image is determined by the eye measurement of the operator. For this reason, it is impossible to accurately determine the inclination angle of the image. In addition, because the rotation operation involves a trail and error process to correct the inclination of the image, it takes a long time to complete the correcting operation. For example, when correcting the inclination of the image on a size A4 paper, it takes approximately 30 seconds to 2 minutes to complete one rotation operation. Hence, even if the size of the image is reduced on the display, it still takes approximately 5 seconds to complete one rotation operation.

Furthermore, it is often difficult to determine a reference position on the display for use as a reference when rotating the image to correct the inclination of the image. Hence, the operator must be skilled in order to make an appropriate correction.

Therefore, there is a demand for an image processing system which can quickly and accurately correct the inclination of the image by a simple operation without the need for a skilled operator.

SUMMARY OF THE INVENTION

Accordingly, it is a general object of the present invention to provide a novel and useful image processing system in which the problems described above are eliminated.

Another and more specific object of the system comprising memory means for storing an input image data in a bit map, display means coupled to the memory means for displaying an image which is described by the input image data, input means for inputting a point data for designating a straight line as a reference line in the image which is displayed on the display means, calculation means coupled to the input means for calculating an inclination angle of the reference line with respect to an axis of a rectangular coordinate of the bit map, and rotation means coupled to the calculation means for rotating the input image data stored in the memory means in the bit map so that the inclination angle becomes approximately zero. According to the image processing system of the present invention, it is possible to quickly and accurately correct the inclination of the image by a simple operation.

Still another object of the present invention is to provide an image processing system comprising first memory means for storing in a bit map an input image data of an image in a full size of the image, compression means coupled to the first memory means for compressing the input image data into compressed image data, second memory means coupled to the compression means for storing the compressed image data in a bit map, display means coupled to the first and second memory means for displaying an image which is described by the compressed image data in a first mode and for displaying the image which is described by the input image data in a second mode, first input means for inputting a point data for designating a straight line as a reference line in the image which is displayed on the display means in the first mode, calculation means coupled to the first input means for calculating an inclination angle of the reference line with respect to an axis of a rectangular coordinate of the bit map, rotation means coupled to the calculation means for rotating the compressed image data stored in the first memory means in the bit map in the first mode so that the inclination angle becomes approximately zero and for rotating the input image data stored in the second memory means in the bit map in the second mode so that the inclination angle becomes approximately zero, and second input means for designating the second mode so as to rotate the image which is described by the input image data based on the image which is displayed on the display means in the first mode. According to the image processing system of the present invention, it is possible to quickly and accurately correct the inclination of the image by a simple operation. The time required to rotate the image data is effectively reduced because the compressed image data is rotated in the first mode and the input image data in the full size is only rotated after a satisfactory display is obtained on the display means and the mode is changed to the second mode.

Other objects and further features of the present invention will be apparent from the following detailed description when read in conjunction with the accompanying drawings.

DESCRIPTION OF THE PREFERRED EMBODIMENTS

Figure 1:
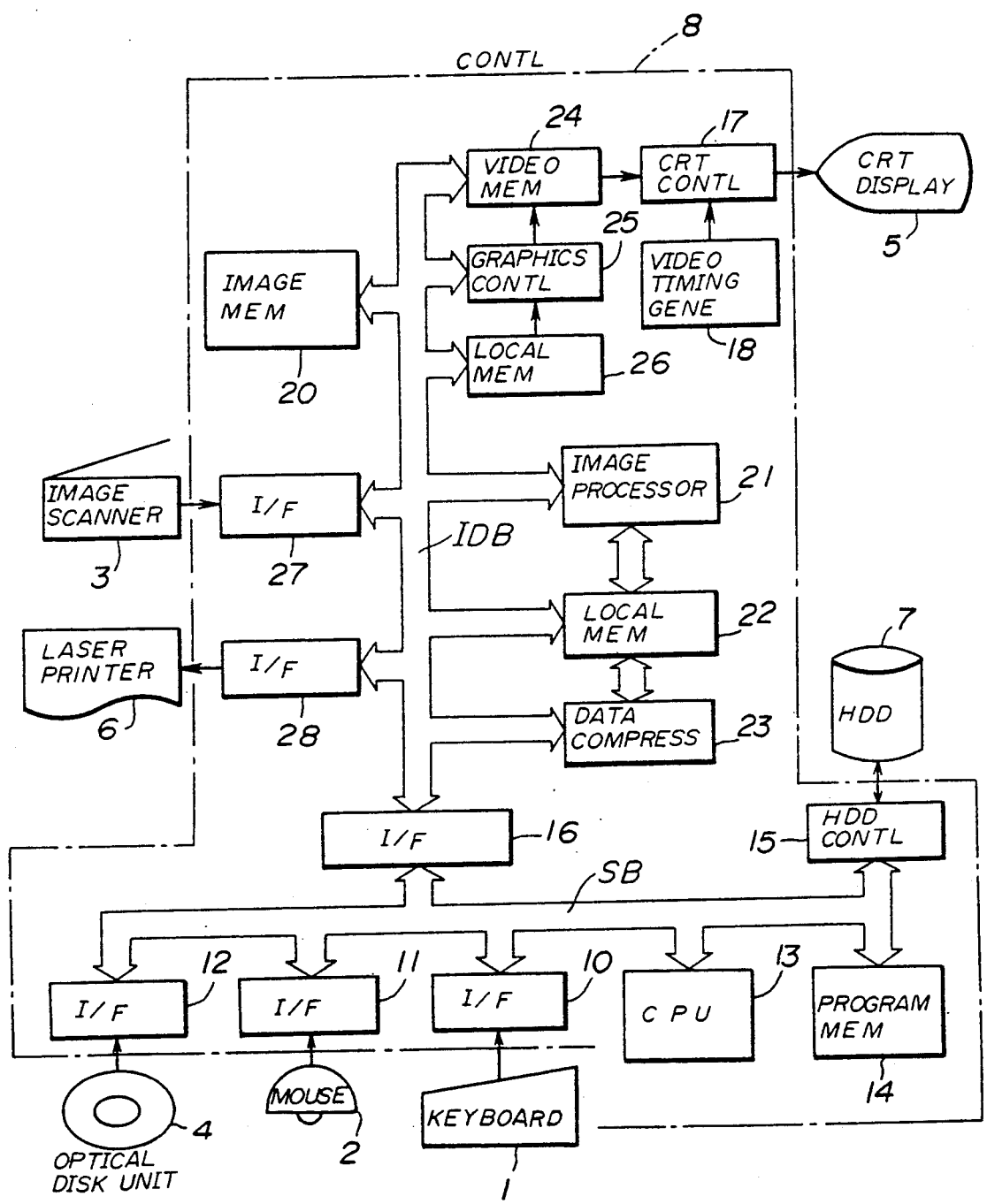
FIG. 1 is a system block diagram showing an embodiment of an image processing system according to the present invention.

FIG. 1 shows an embodiment of an image processing system according to the present invention. The image processing system comprises as input devices a keyboard 1, a mouse 2, an image scanner 3, and an optical disk unit 4. The keyboard 1 includes various character keys, function keys, a ten-key, a cursor moving key and the like. The mouse 2 is used as a pointing device. The image scanner 3 reads a document image, and the optical disk unit 4 reads an image from an optical disk.

The image processing system comprises as output devices a cathode ray tube (CRT) display device 5 and a laser printer 6. The CRT display device 5 is used as a display device for displaying an input image, work menus and the like. The laser printer 6 is used as a printing device for printing an image data which is input from the image scanner 3 or the like and is subjected to various image processings and an inclination correction which will be described later.

The image processing system further comprises a hard disk drive (HDD) 7 which is used as a storage device. The HDD 7 stores various application programs for processing inputs and the image data which is input from the input device and subjected to the inclination correction. A controller 8 is also provided in the image processing system. The controller 8 controls the input devices, the output devices and the storage device described above. The controller 8 also carries out various image processing including the inclination correction.

Next, a description will be given of the functions of various parts of the controller 8. An image memory 20 comprises a plurality of page buffers for storing each page of the image data which is obtained by developing the input image data from the image scanner 3 or the optical disk unit 4 into a bit map in full size (that is, with a number of dots dependent on the resolution of the image scanner 3 or the optical disk unit 4). The image memory 20 also comprises a work buffer which amounts to at least one page and is used when rotating the image data.

An image processor 21 is constituted by a microprocessor for carrying out the image processing such as the rotation and correction of the full size image data which is stored within the image memory 20.

A local memory 22 temporarily stores programs of the image processor 21 and a compressed image data which is obtained from a data compression part 23. The data compression part 23 is constituted by a microprocessor for reducing a data quantity of the full size image data by carrying out a compression process.

A video memory 24 stores the compressed image data from the data compression part 23 and displays the compressed image data on a screen of the CRT display device 5. The video memory 24 has a memory capacity for storing at least one page of the display data and one page for rotating the display data. In other words, the video memory 24 has a display memory area and a work memory area.

A graphics controller 25 is constituted by a microprocessor for processing the display on the display screen such as rotating the compressed image data.

A local memory 26 stores programs of the graphics controller 25 and data which are required when carrying out a process on the graphics controller 25.

A central processing unit (CPU) 13 carries out a sequential control of the image processing system as a whole. In addition, the CPU 13 carries out calculation processes such as calculating an inclination angle of a reference line when making the inclination correction.

A program memory 14 stores resident programs such as an operating system which are loaded from the HDD 7 at the time of a system start up.

A keyboard interface 10, a mouse interface 11, an optical disk unit interface 12, and an image scanner interface 27 respectively control inputs from the keyboard 1, the mouse 2, the optical disk unit 4 and the image scanner 3. A bus controller interface 16 controls a flow of information between an image data bus IDB and a system bus SB.

a HDD controller 15 controls a program read-out and a data write-in with respect to the HDD 7.

A CRT controller 17 outputs the image data from the video memory 24 as a video signal in synchronism with a timing signal which is generated from a video timing generator 18, and carries out a control to display the video signal on the screen of the CRT display device 5.

Next, a description will be given of the operation of this embodiment. The image data input from the image scanner 3 or the optical disk unit 4 is stored in the image memory 20 as a full size image data (source data). This full size image data is subjected to a data compression in the data compression part 23 so as to reduce the number of bits of the image data. The compressed image data is supplied to the video memory 24. The video memory 24 stores the compressed image data by developing the compressed image data into a bit map. The CRT controller 17 successively outputs the image data stored in the video memory 24 as a video data for display on the CRT display device 5.

When the operator instructs a rotation correction from the mouse 2 or the keyboard 1 to correct the inclined image, the graphics controller 25 designates the reference line or draws the reference line in response to a point data which is input thereafter. The CPU 13 calculates an inclination angle of the reference line to an axis of the rectangular coordinate of the bit map.

The graphics controller 25 uses the work region to rotate and correct the compressed image data in the display region of the video memory 24 so that a smaller one of the inclination angles with respect to x and y axes which are calculated in the CPU 13 becomes zero. The image data after the rotation is supplied from the video memory 24 to the CRT display device 5 via the CRT controller 17 and is displayed on the screen of the CRT display device 5.

When the operator judges that the displayed image on the display of the CRT display device 5 is good, this judgement result is input from the keyboard 1 or the mouse 2. Hence, the image processor 21 uses the work buffer to rotate the full size image data which is stored in the image memory 20 an angle identical to the rotation angle used to rotate the compressed image data by the graphics controller 25, and the inclined image is corrected. The rotated image which is thus corrected of the inclination can be printed on the laser printer 6 if needed.

Figures 2A, 2B, 3:
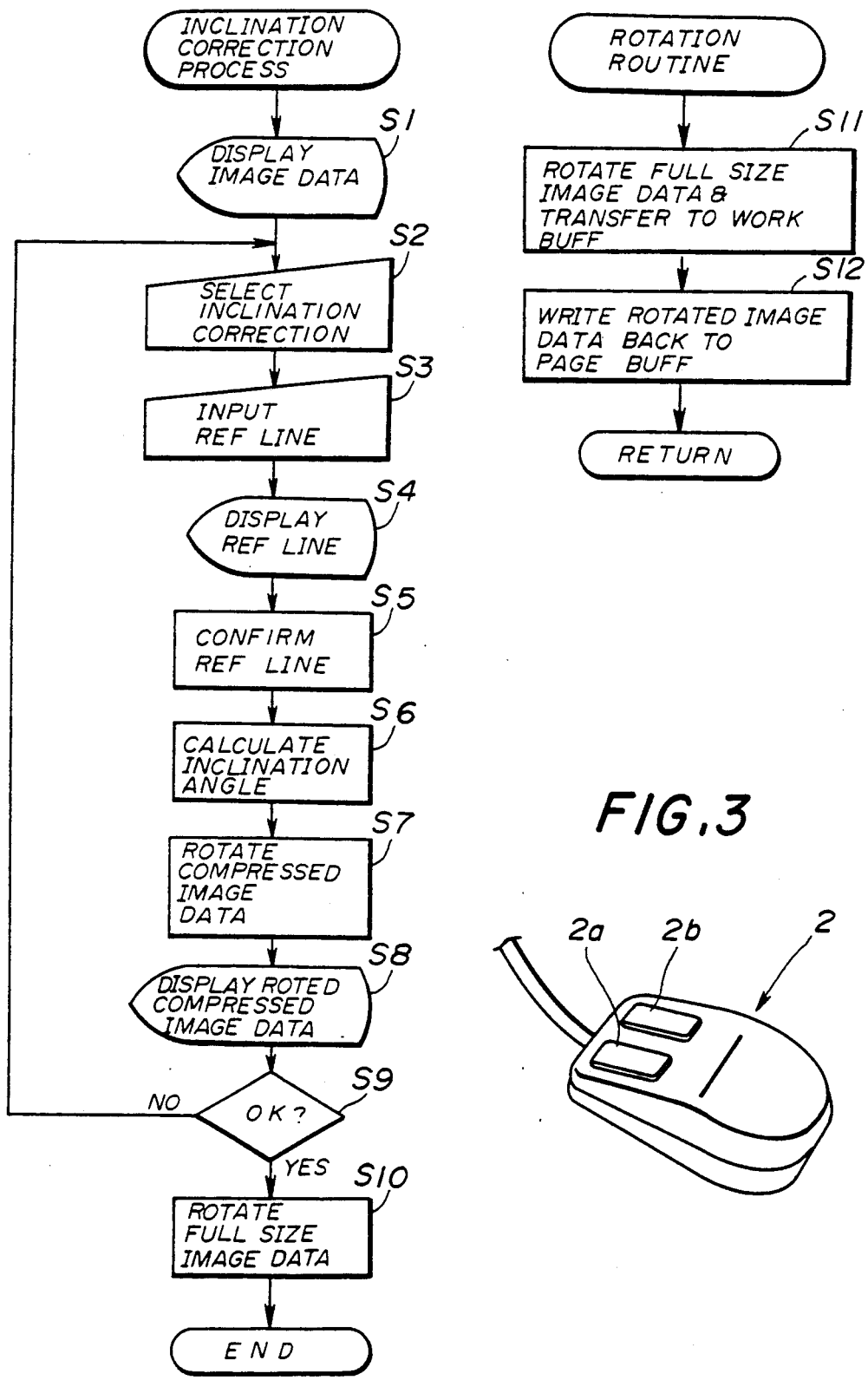
FIGS. 2A and 2B respectively are flow charts for explaining an image data inclination correction process of the embodiment.
FIG. 3 is a perspective view showing an external appearance of a mouse.

Next, a description will be given of the image data inclination correction process of this embodiment, by referring to FIGS. 2A and 2B. FIG. 2A shows an inclination correction routine and FIG. 2B shows a rotation routine of the controller 8.

In FIG. 2A, a step S1 displays the input image data on the screen of the CRT display device 5. A step S2 selects the inclination correction operation with respect to the image.

Figure 4:
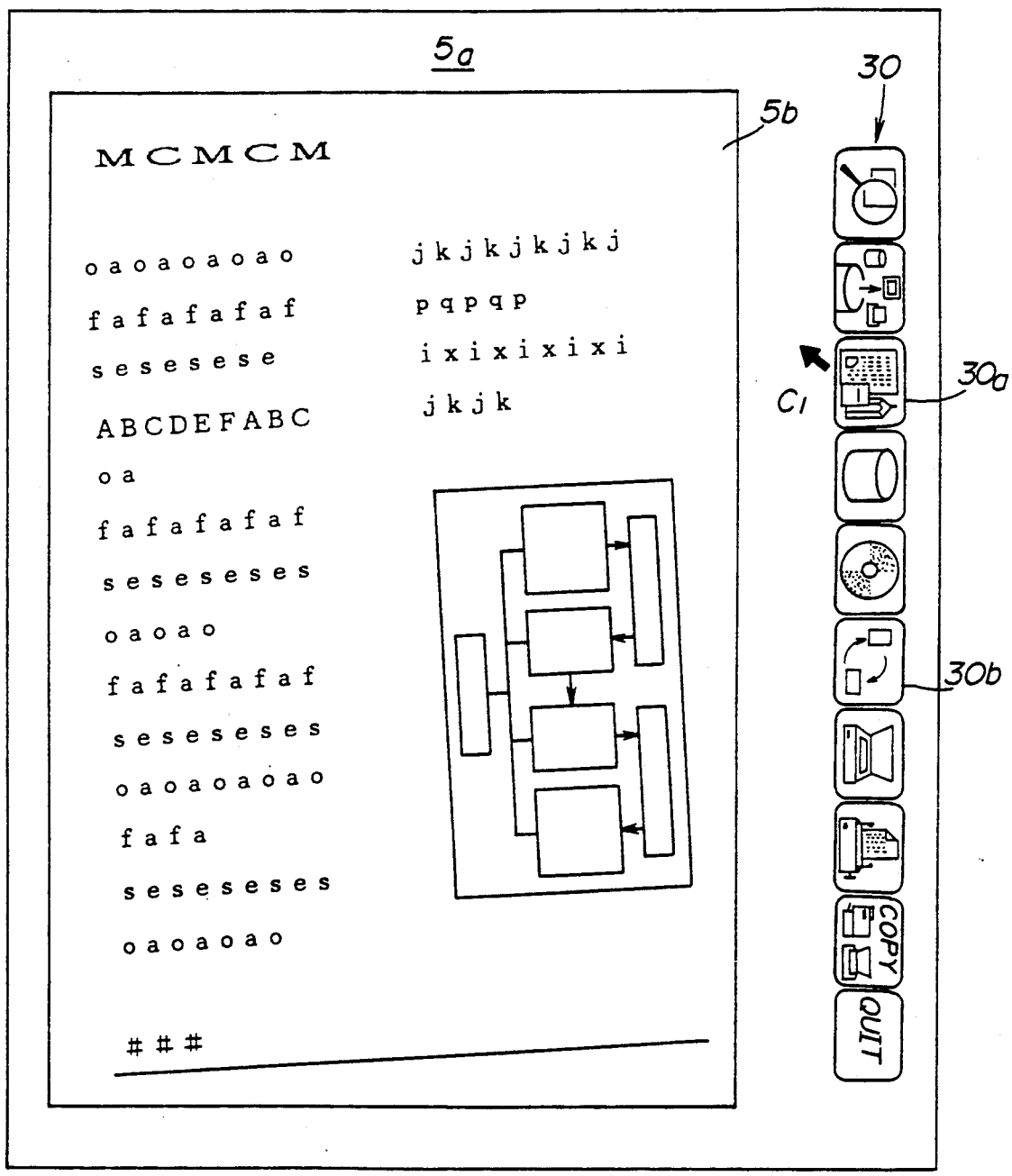
FIGS. 4 through 10 respectively are diagrams for explaining various displays on a display screen when making the image data inclination correction process up to a point of inputting a reference line.

FIG. 4 shows a display on the display screen of the CRT display device 5. The image is displayed within a data display region 5b of a display screen 5a of the CRT display device 5. An indicator (icon) group 30 which indicates work menus for selecting various operation is displayed on the right side of the data display region 5b. In FIG. 4, the displayed image is inclined to the contour of the data display region 5b.

When the operator manipulates the mouse 2 shown in FIG. 3 to move a mouse cursor C1 on the display screen 5a to a position of an indicator 30a which selects the "image editer" and pushes a button 2a, the image editing function is called. A button 2b of the mouse 2 is used for cancelling a previous input made from the mouse 2.

Figure 5:
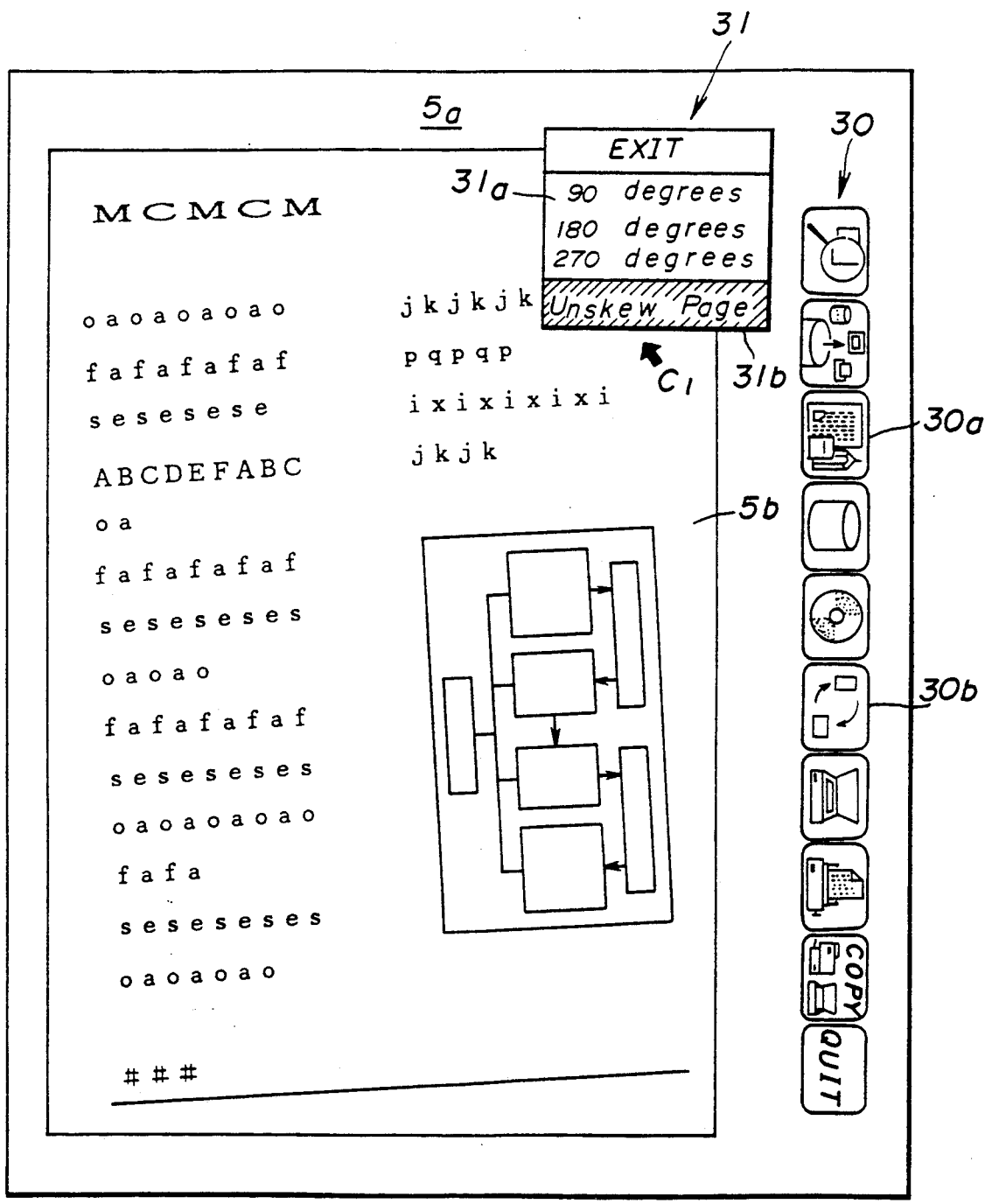

Next, when the operator moves the mouse cursor C1 to a position of an indicator 30b which selects the "rotation process" and pushes the button 2a of the mouse to carry out the inclination correction operation, a sub menu 31 is displayed on the upper right of the display screen 5a as shown in FIG. 5. The sub menu 31 includes items on the rotation operation.

The sub menu 31 includes a menu column 31a for the normal rotation process and a menu column 31b for the inclination correction process. When the operator moves the mouse cursor C1 to a position of the menu column 31b and pushes the button 2a of the mouse 2, the sub menu 31 and the indicator group 30 are erased from the display screen 5a. Instead, a menu 32 for confirming the correction operation is displayed on the upper right of the display screen 5a. In this state, it is possible to start the inclination correction operation with respect to the image. Further, a cross-shaped mouse cursor C2 for inputting a pointed data is displayed within the data display region 5b. The mouse cursor C2 is movable by the mouse 2.

In a step S3 shown in FIG. 2A, the operator uses the mouse 2 to input the point data for designating or drawing the reference line which is used for the inclination correction. A step S4 displays the reference line, and a step S5 makes a confirmation of the reference line. There are several methods of inputting the point data and designating or drawing the reference line. A description will now be given of a method in which a line or a character string within the displayed image is used when inputting the point data and designating or drawing the reference line.

Figure 6:
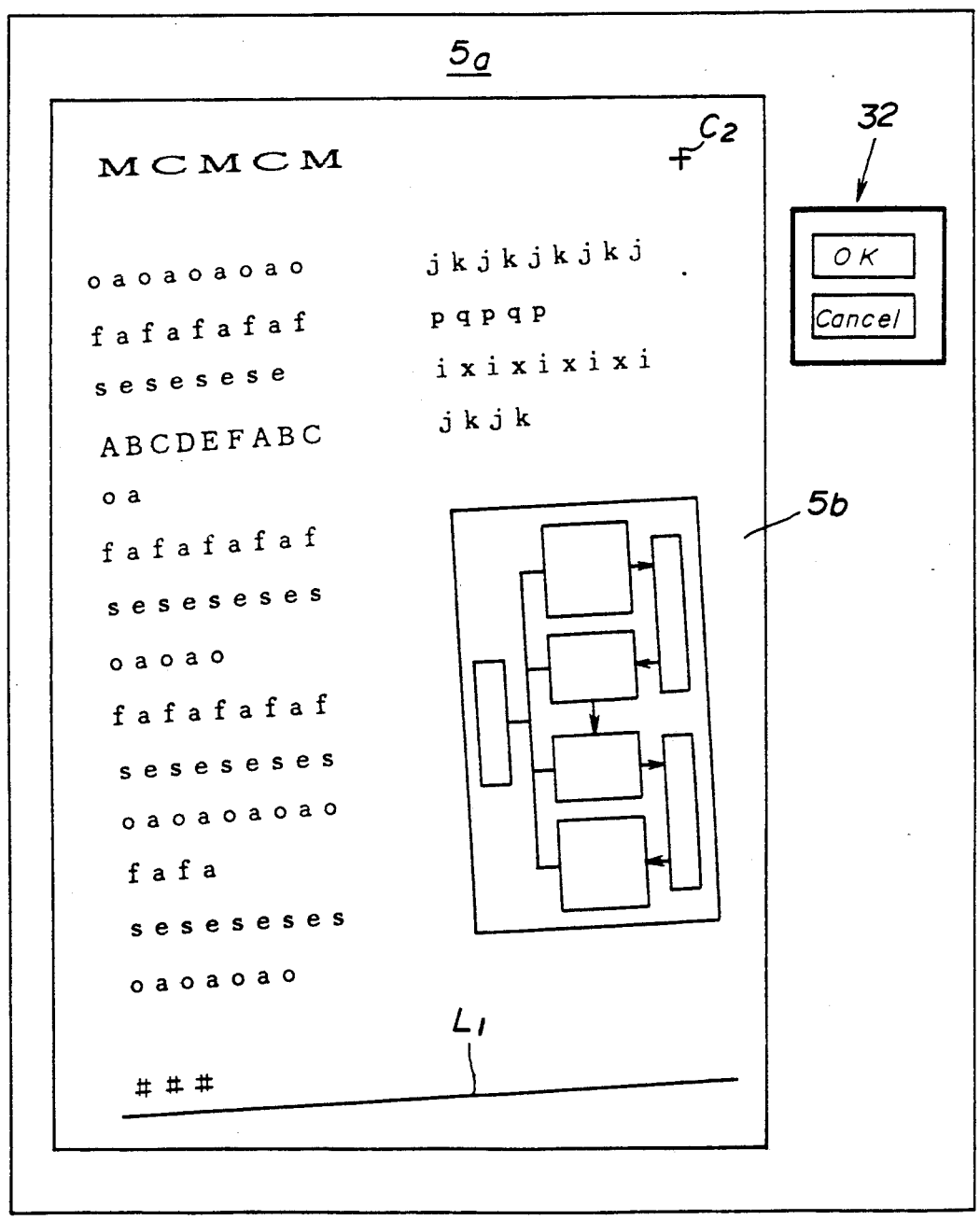

When straight lines which extend in a direction parallel or perpendicular to the character string exist within the image which is displayed within the data display region 5b of the display screen 5a as shown in FIG. 6, a straight line which is preferably the longest is selected. L1 denotes such a straight line which is selected.

Figure 7:
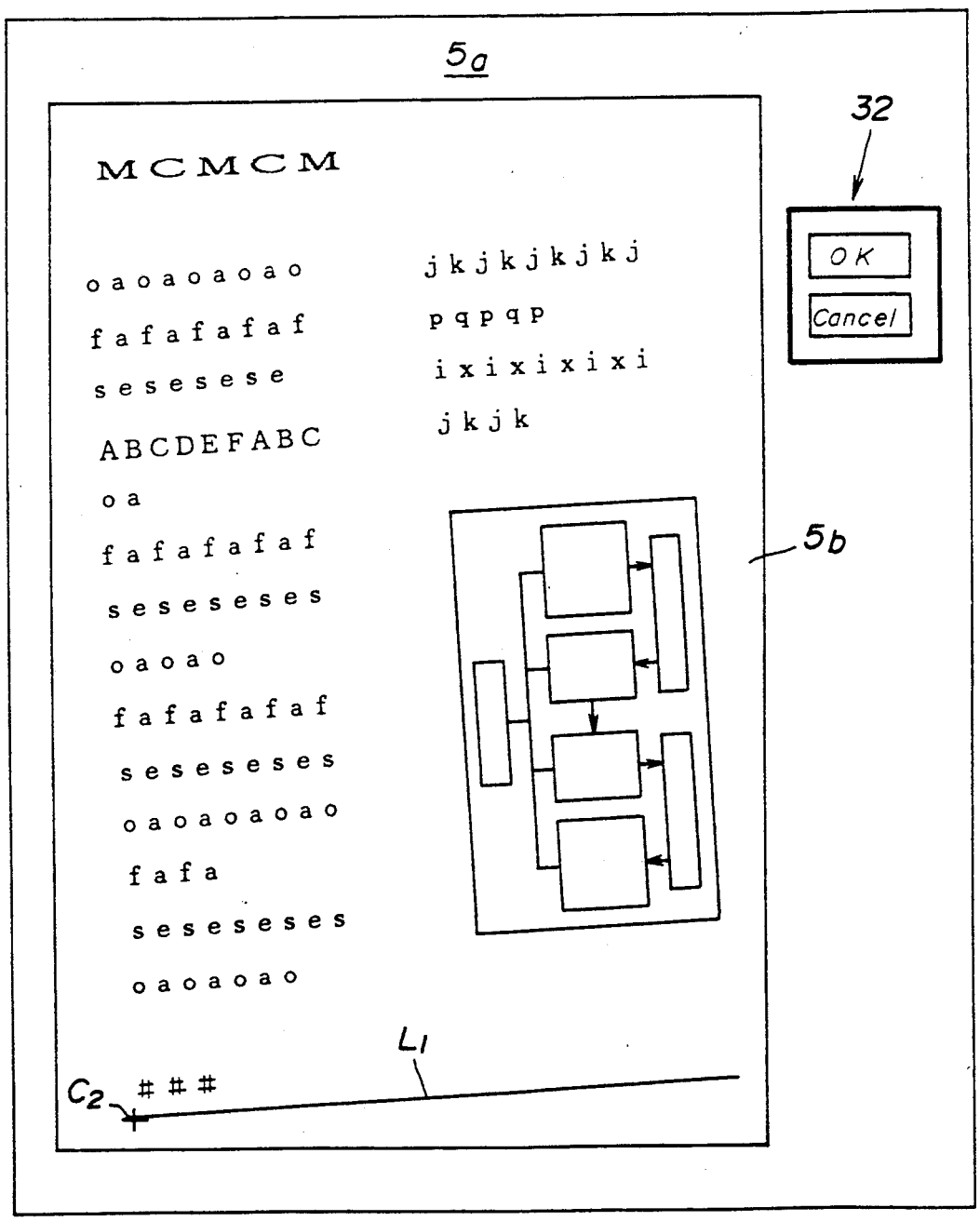
Figure 8:
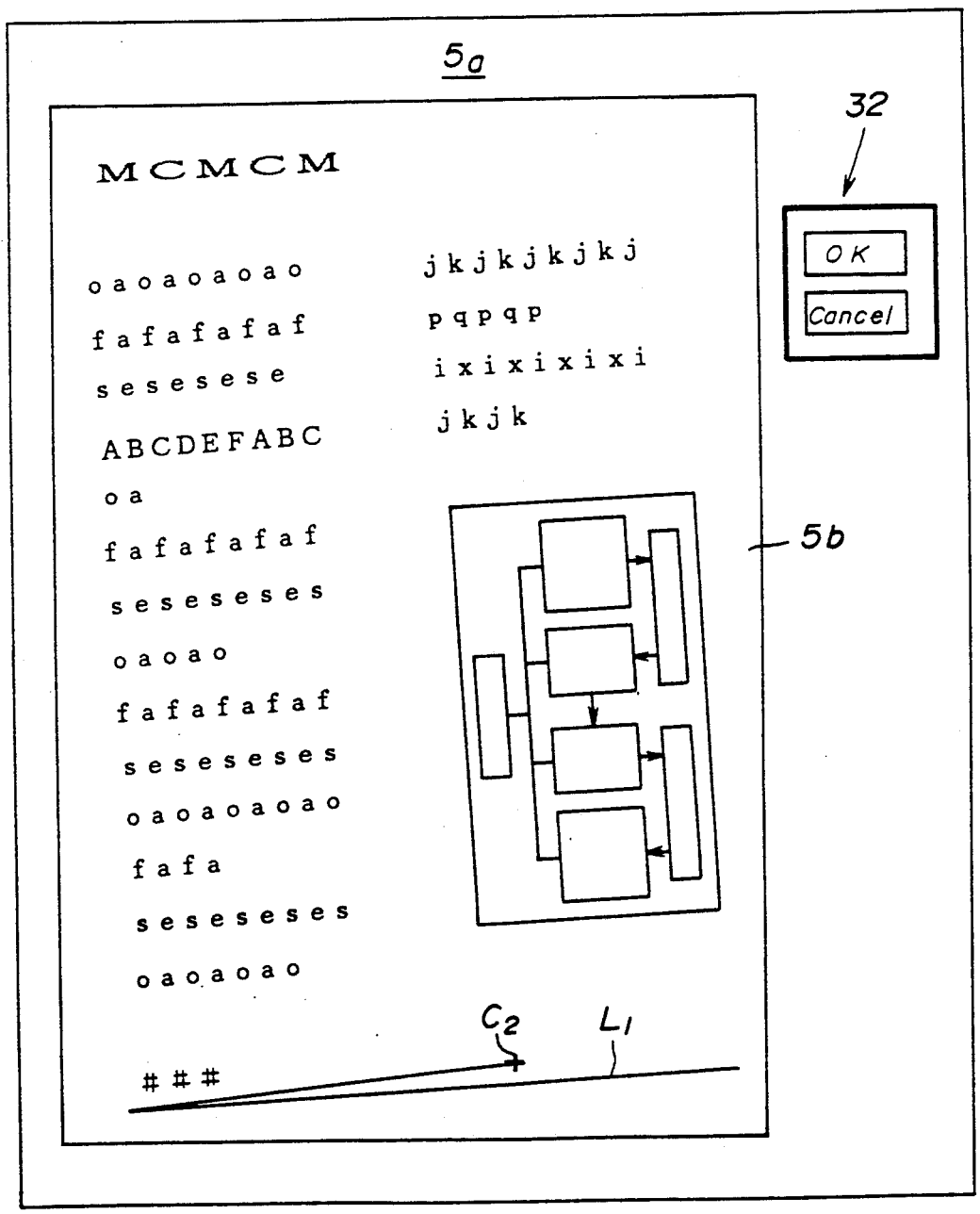

In this case, when the center of the mouse cursor C2 is aligned to the left end of the selected straight line L1 as shown in FIG. 7 and the button 2a of the mouse 2 is pushed, the coordinate data of this point is entered. When the mouse 2 is thereafter moved to the right, a solid line is drawn with reference to the point which is first entered. When the center of the mouse cursor C2 is made to coincide with the straight line L1 at a suitable position in a vicinity of the right end of the straight line L1, the drawn solid line overlaps the straight line L1 and this solid line is confirmed as the reference line when the button 2a of the mouse 2 is pushed.

The above described operation may be simplified as follows. That is, the center of the mouse cursor C2 is made to coincide with an arbitrary position on the straight line L1, and the straight line L1 is designated by pushing the button 2a of the mouse 2. In this case, the controller 8 of the image processing system recognizes the consecutive dots including the designated point, and the straight line L1 is confirmed as the reference line.

On the other hand, when there is no suitable straight line in the displayed image, it is possible to draw the reference line by drawing an underline under the character string in the displayed image.

Figure 9:
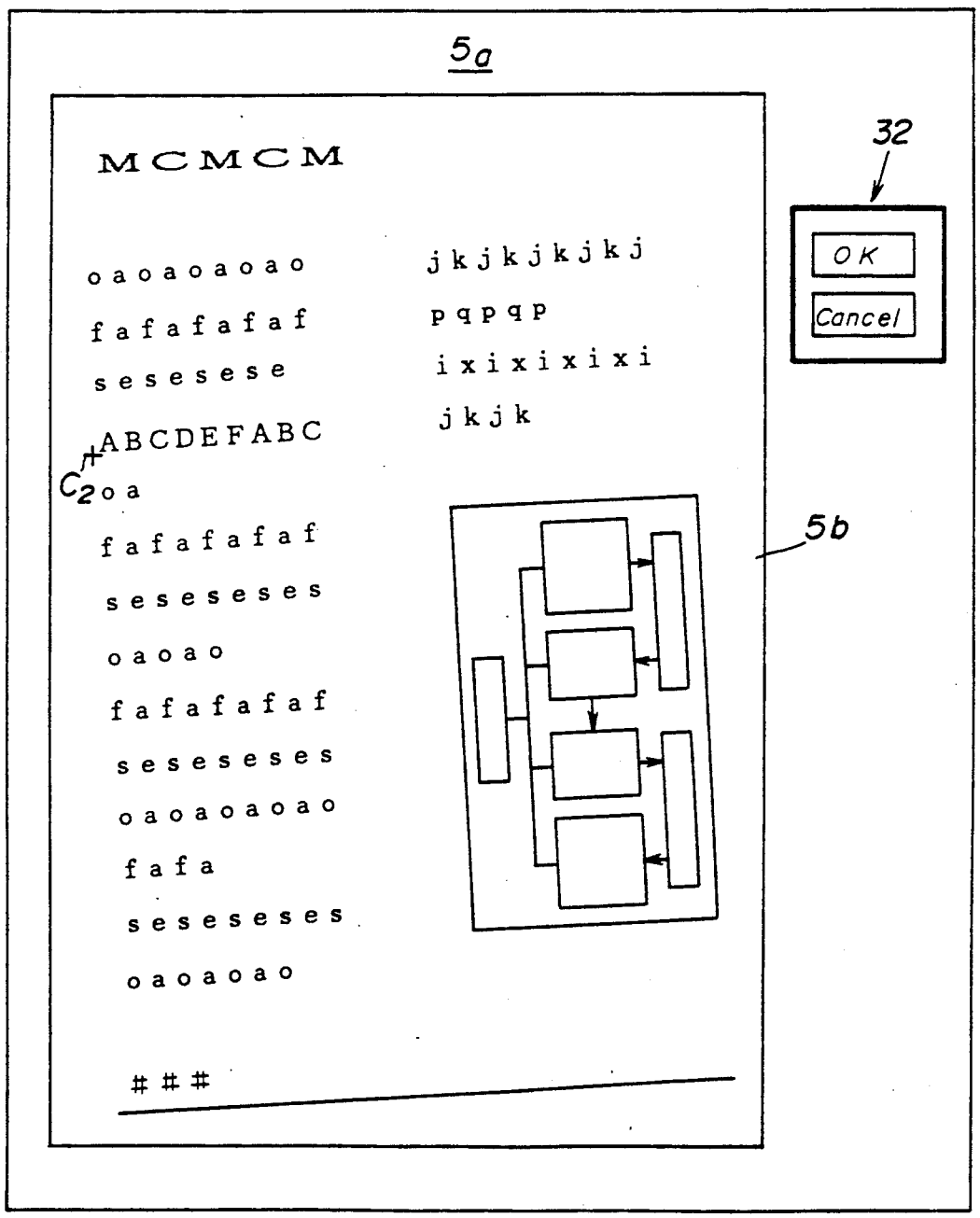
Figure 10:
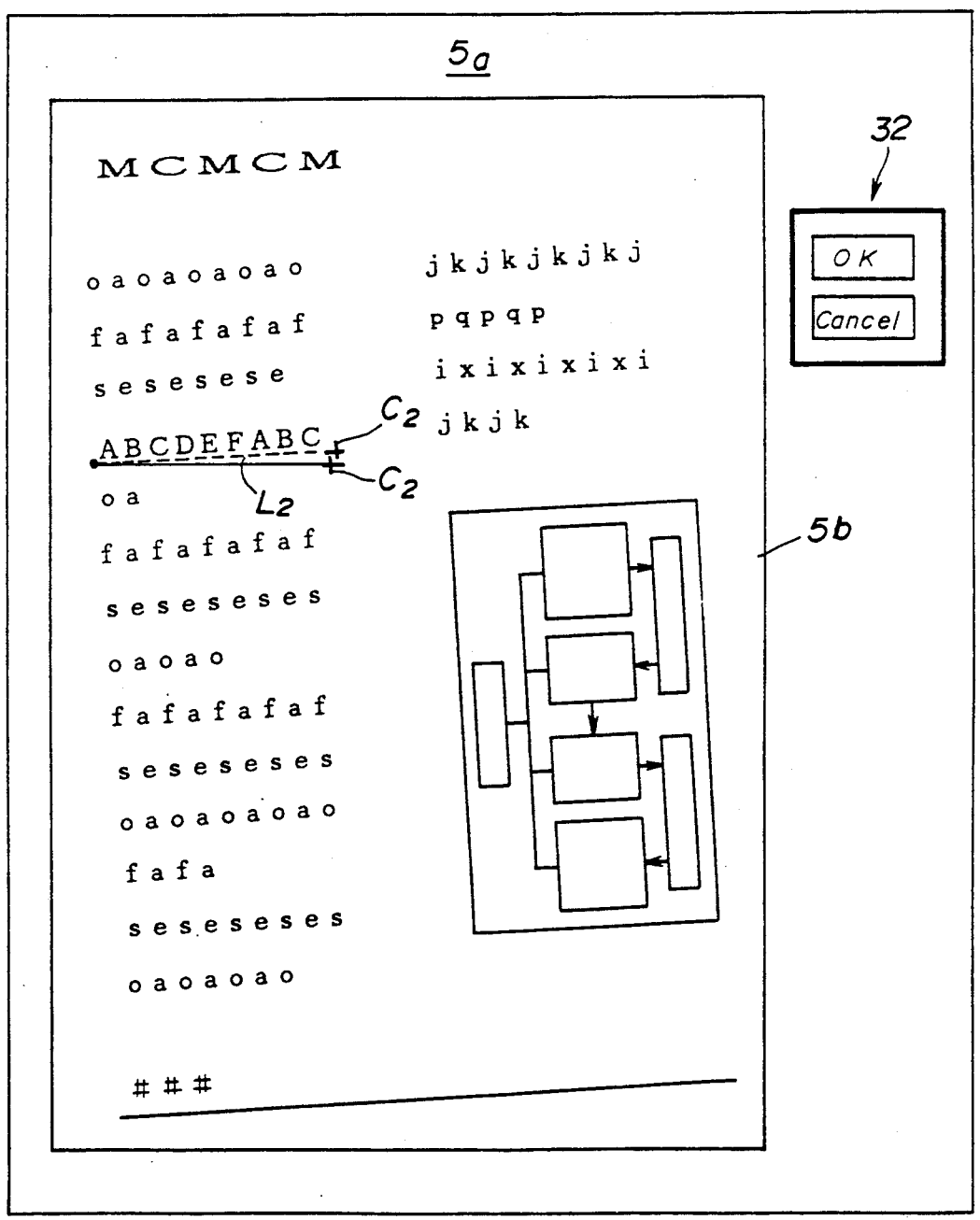

In this case, when the center of the mouse cursor C2 is aligned to the lower side of the character in a vicinity of the left end of the selected character string as shown in FIG. 9 and the button 2a of the mouse 2 is pushed, the coordinate data of this point is entered. When the mouse 2 is thereafter moved to the right, the solid line is drawn with reference to the point which is first entered.

In this case, when the center of the mouse cursor C2 is aligned to the lower side of the character in a vicinity of the right end of the selected character string, the solid line which is drawn becomes a straight line L2 which extends along the lower side of the character string as indicated by a phantom line. This straight line L2 is confirmed as the reference line when the button 2a of the mouse 2 is pushed.

When the reference line is confirmed in the above described manner, the process advances to a step S6 shown in FIG. 2A. The step S6 calculates the inclination angle of the reference line. This calculation is made by the CPU 13 shown in FIG. 1, and the method of calculation is as follows.

Figure 11:
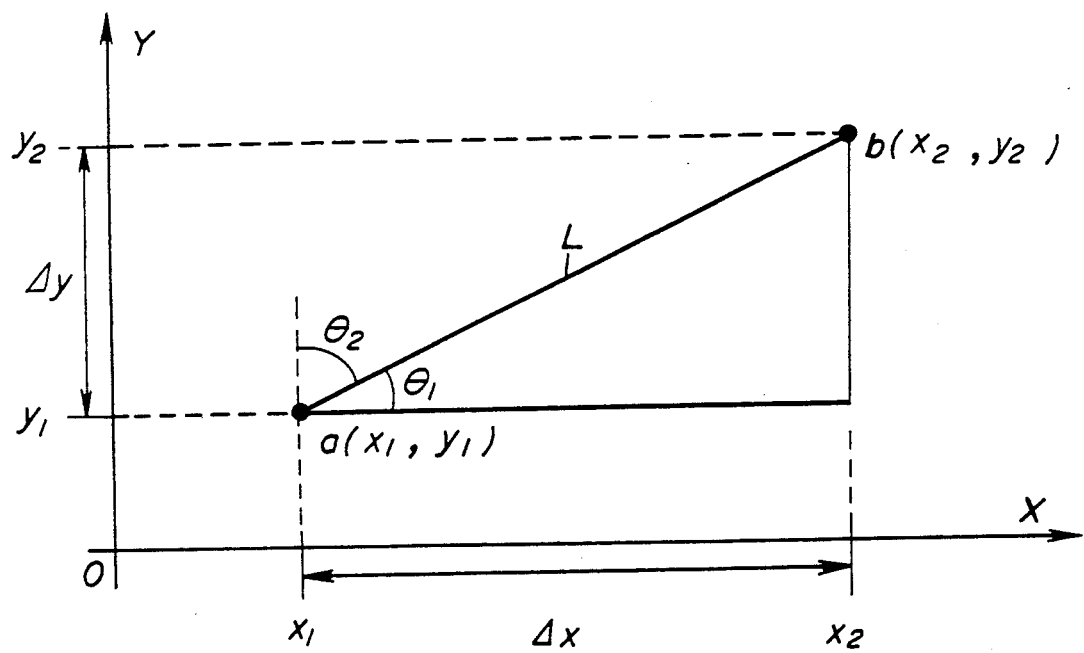
FIG. 11 is a diagram for explaining a method of calculating an inclination angle of the reference line.

As shown in FIG. 11, when it is assumed that two points a and b on the reference line L respectively have coordinate values $a(x_1, y_1)$ and $b(x_2, y_2)$ with respect to the x and y axes in the coordinate system of the bit map, an x-component $\Delta x$ and a y-component $\Delta y$ of the reference line L can be described by the following formulas.

$$\Delta x = x_2 - x_1$$

$$\Delta y = y_2 - y_1$$

When the reference line L forms an angle $\theta 1$ with respect to the x axis and forms an angle $\theta 2$ with respect to the y axis, these angles $\theta 1$ and $\theta 2$ can be calculated from the following formulas.

$$\theta 1 = \tan^{-1}(\Delta y / \Delta x)$$

$$\theta 2 = \tan^{-1}(\Delta x / \Delta y) = (\pi/2) - \theta 1$$

The angles $\theta 1$ and $\theta 2$ are calculated in this manner, and a smaller one of the angles $\theta 1$ and $\theta 2$ is considered as an inclination angle $\theta$ of the image. In FIG. 11, $\theta 1 < \theta 2$ and the angle $\theta 1$ is considered as the inclination angle $\theta$.

The, a step S7 rotates the image data within the video memory 24 by the graphics controller 25 so that the inclination angle $\theta$ becomes zero. In this case, the image data is rotated clockwise because the reference line L is a leftwardly declining straight line.

Generally, the inclination angle $\theta$ of the image is relatively small. For this reason, when the reference line L is a straight line which is approximately horizontal as in the above described case, the image data is rotated so as to become parallel to the reference line L. If the reference line L is a rightwardly declining straight line, the image data is rotated counterclockwise.

On the other hand, when the reference line L is an approximately vertical straight line, the image data is rotated so that the reference line L becomes parallel to the y axis. The image data is rotated clockwise when the reference line L is a rightwardly declining straight line and is rotated counterclockwise when the reference line L is a leftwardly declining straight line.

The image data is rotated by rotating the compressed image data in the display memory area of the video memory 24 and transferring the rotated compressed image data to the work memory area of the video memory 24.

Figure 12:
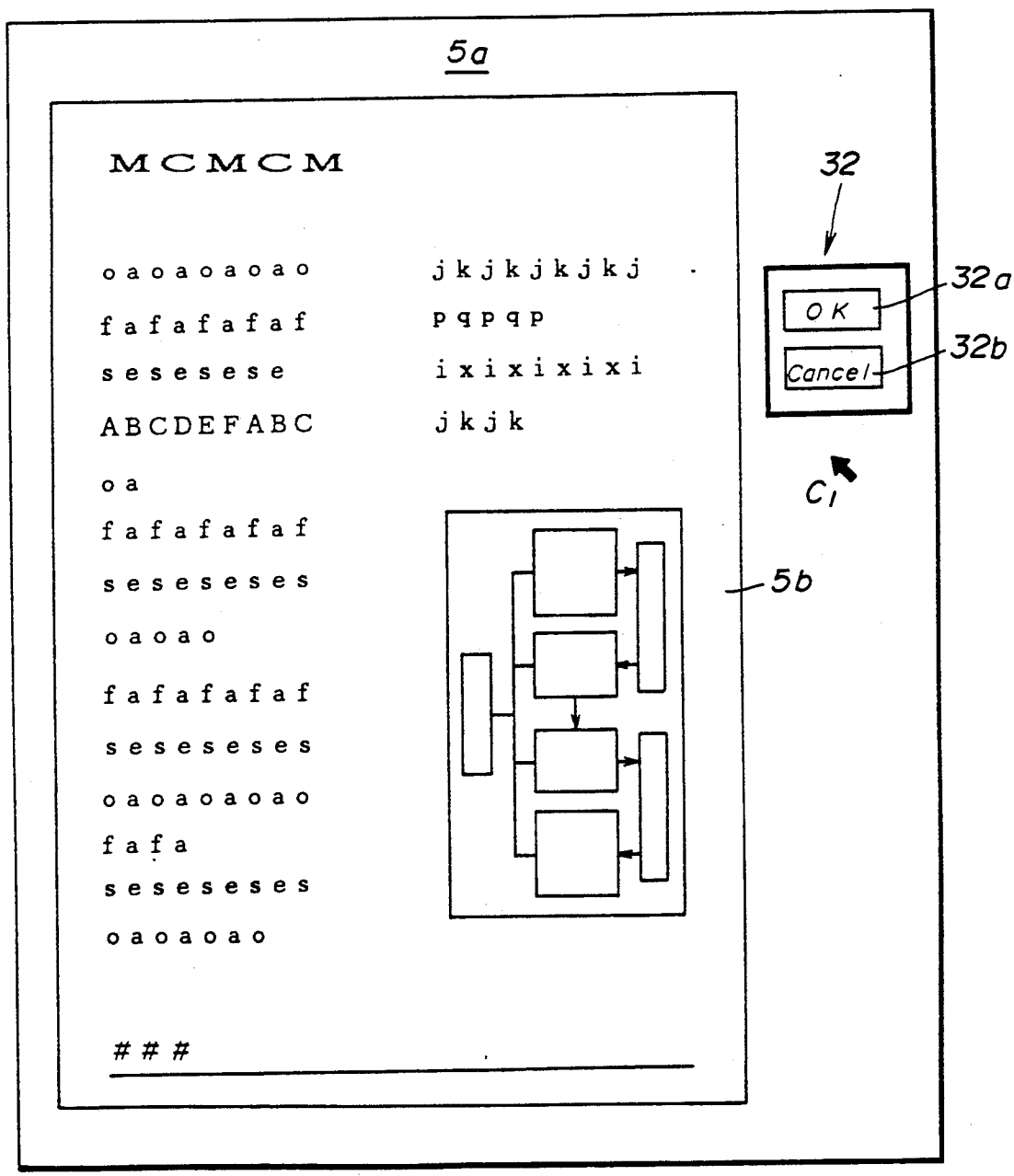
FIG. 12 is a diagram for explaining a display on the display screen when only a display data is subject to the inclination correction.

A step S8 shown in FIG. 2A displays the rotated image data on the display screen 5a of the CRT display device 5. As shown in FIG. 12, the image which is displayed within the data display region 5b of the display screen 5a has no inclination or skew, that is, the inclination of the input image data is eliminated. In this state, the mouse cursor C1 is also displayed on the display screen 5a.

Thereafter, the operator judges the confirmation result. When the operator is unsatisfied with the image displayed on the display screen 5a, the operator moves the mouse cursor C1 to a position of a "cancel" column 32b of the menu 32 and pushes the button 2a of the mouse 2. As a result, a step S9 discriminates by the CPU 13 that the correction result is no good, and the process returns to the step S1. On the other hand, the operator moves the mouse cursor C1 to a position of a "OK" column 32a of the menu 32 and pushes the button 2a of the mouse 2 when the operator is satisfied with the image displayed on the display screen 5a. In this case, the step S9 discriminates by the CPU 13 that the correction result is good, and the process advances to a step S10.

The step S10 rotates the full size image data in the page buffer of the image memory 20 by the image processor 21 so as to correct the inclination of the image. The step S10 corresponds to the rotation routine shown in FIG. 2B.

In FIG. 2B, a step S11 rotates the full size image data in the page buffer of the image memory 20 so that the inclination angle $\theta$ calculated in the step S6 becomes zero, and transfers the rotated full size image data to the work buffer of the image memory 20. Then, a step S12 writes the rotated full size image buffer in the work buffer back into the page buffer of the image memory 20.

Figure 13:
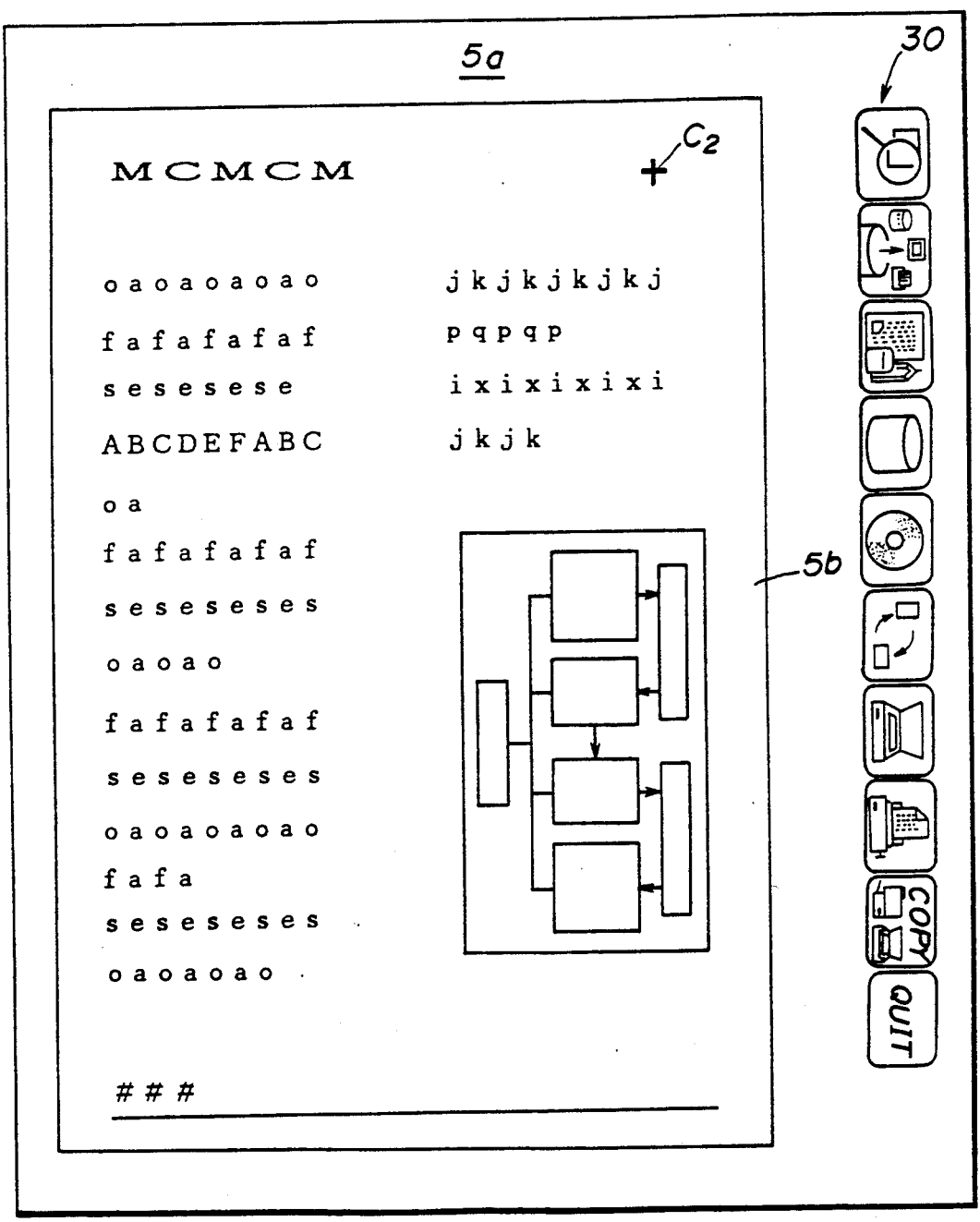
FIG. 13 is a diagram for explaining a display on the display screen when an inclination correction is completed for a full size data.

The displayed image on the display screen 5a becomes as shown in FIG. 13 when the correction operation is ended with respect to the inclined image.

According to this embodiment, the inclination of the input image can be accurately corrected by a simple operation. By setting the reference line, it is possible to make an accurate inclination correction even when no contour or the like which can be used as a reference for the inclination correction exists in the input image data such as the case where the image scanner 3 reads a document which has an image which is copied thereon with an inclination. In addition, it is possible to considerably reduce the processing time of the inclination correction, because the compressed image data for display is first rotated (corrected) and displayed and the full size image data having a large data quantity is then rotated (corrected) and displayed only after it is confirmed that the corrected and displayed compressed image data is satisfactory.

Next, a description will be given of another method of inputting the reference line. According to this other method, the reference line is automatically set by designating an area which includes the character string on the display screen 5a.

Figure 14:
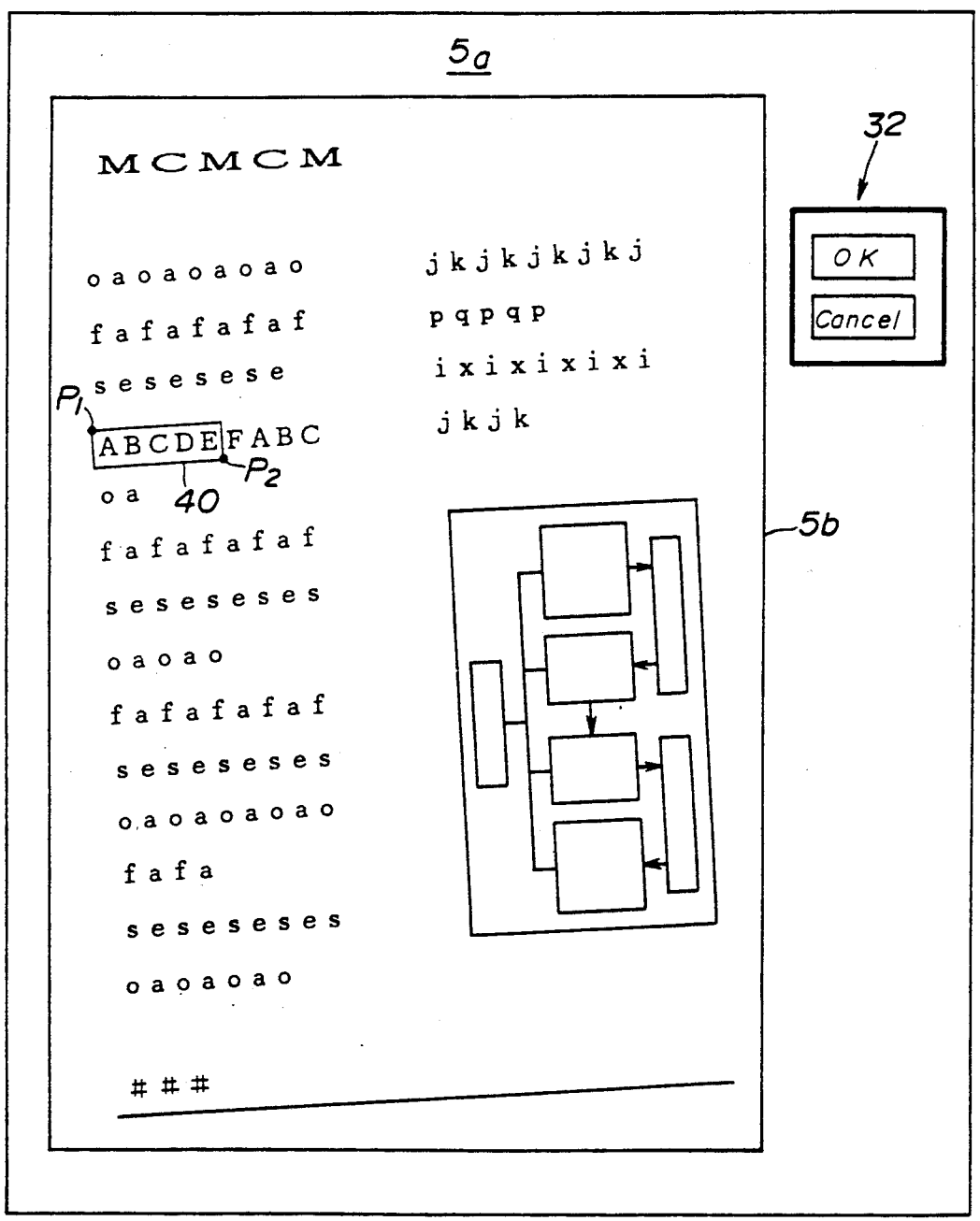
FIG. 14 is a diagram for explaining a method of designating an area on the display screen for setting the reference line.

For example, a rectangular area which includes an arbitrary character string of the image displayed within the data display region 5b of the display screen 5a may be designated as follows. That is, two points P1 and P2 which correspond to diagonal points of the rectangular area shown in FIG. 14 are designated by the mouse cursor so as to store the coordinates of these two points P1 and P2. In FIG. 14, the designated rectangular area is an area 40 which includes a character string "ABCDE".

Figure 15:
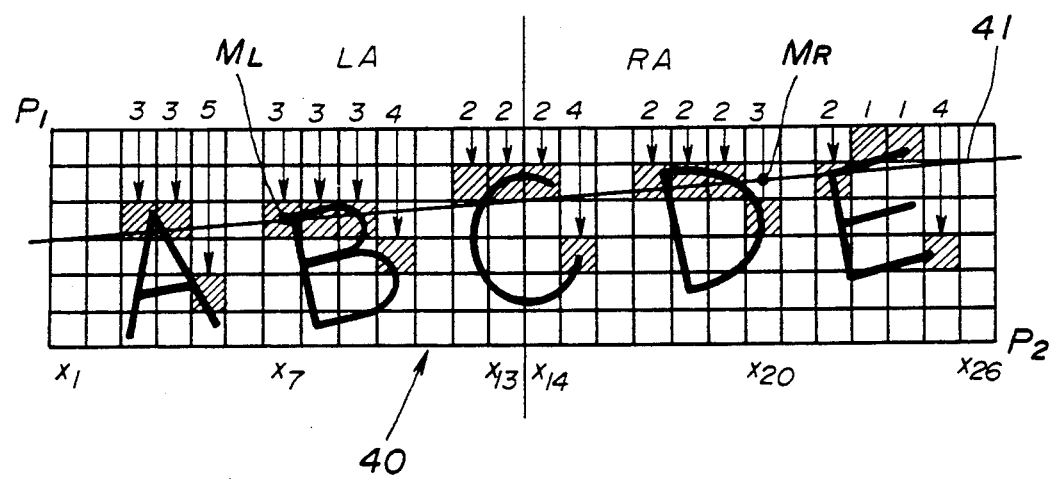
FIG. 15 is a diagram for explaining a method of setting the reference line by a CPU using a character string within a designated area.

The area 40 is extracted in the bit map, and this extracted area 40 is shown on an enlarged scale in FIG. 15. In FIG. 15, each small square corresponds to one dot (bit). Actually, the number of dots is considerably larger than as shown in FIG. 15 which shows only a small number of dots for the sake of convenience.

A scan is made from the top side to the bottom side for each column of the area 40 starting from a column $x_1$ to a column $x_{25}$, and a number of dots is counted until a first black dot is found in each column. In FIG. 15, the counted number of dots for each column is indicated above the column.

The area 40 is then divided into a right area RA and a left area LA. An average value of the counted numbers of dots is obtained for each of the right and left areas RA and LA, excluding those columns having no black dots. In this case, the average value for the right area RA is $23/10 = 2.3$ and this value is rounded to an integer "2". Similarly, the average value for the left area LA is $28/9 = 3.1$ and this value is rounded to an integer "3".

An average point $M_L$ of the left area LA is assumed to be the third dot from the top side in the column $x_7$ which is the center column in the left area LA along the row direction (x direction). On the other hand, an average point $M_R$ of the right area RA is assumed to be the second dot from the top side in the column $x_{20}$ which is the center column in the right area RA along the row direction (x direction). A straight line 41 which passes these average points $M_L$ and $M_R$ is set as the reference line.

Next, a description will be given of a method of more accurately setting the reference line from the character string within the designated area.

Figure 16:
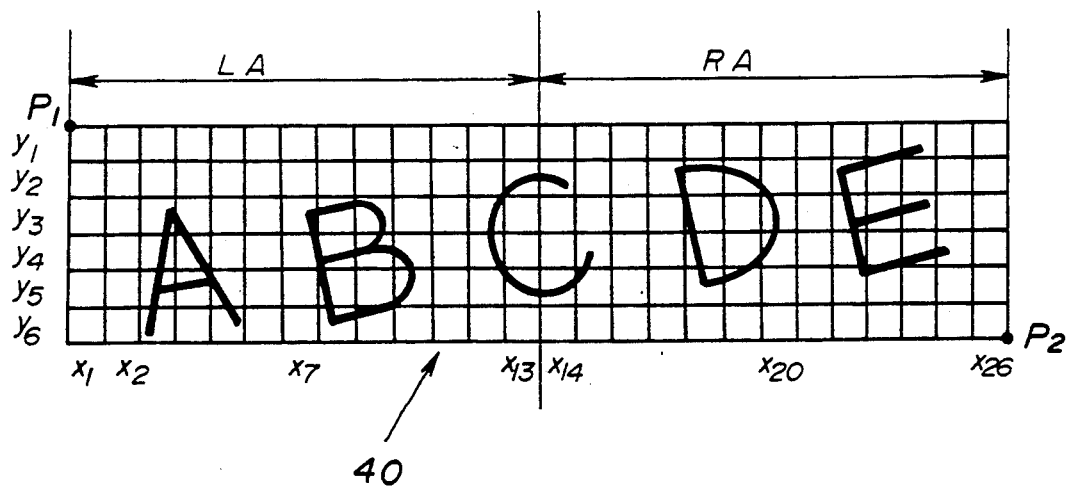
FIGS. 16 through 18 respectively are diagrams for explaining other methods of setting the reference line by the CPU using the character string within the designated area.

FIG. 16 shows on an enlarged scale the area 40 which is designated by the two points P1 and P2 similarly as described above. This area 40 is extracted in the bit map and divided into the right area RA and the left area LA.

Figure 17:
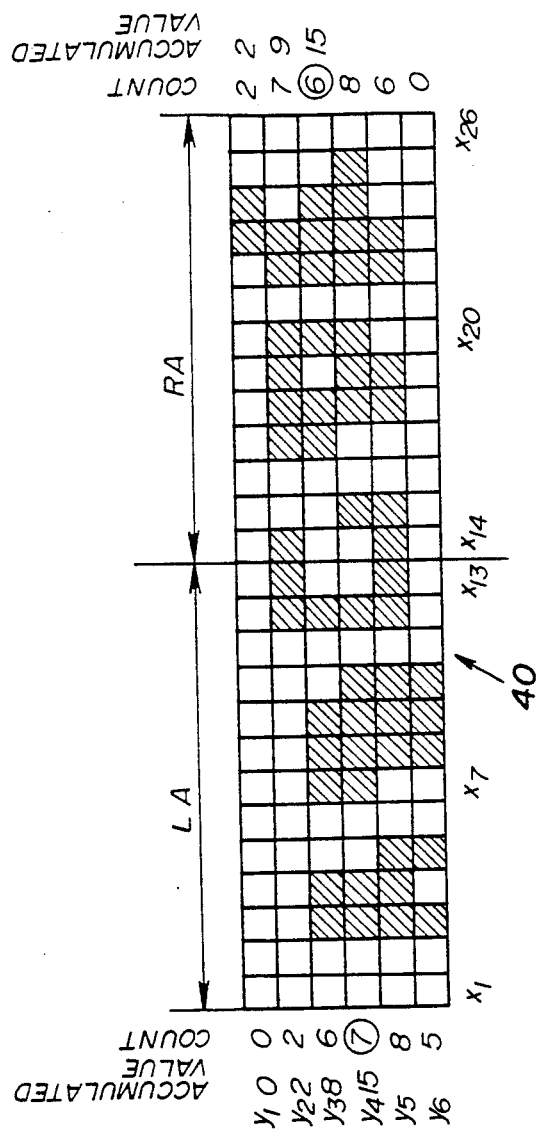

FIG. 17 shows the "black" dots of the character string by hatchings. Actually, the number of dots is considerably larger than as shown in FIG. 17 which shows only a small number of dots for the sake of convenience.

The number of "black" dots is counted for each of the rows $y_1$ through $y_6$ for each of the right and left areas RA and LA. The counted number of "black" dots in each row within the left area LA is indicated on the left of the row and the counted number of "black" dots in each row within the right area RA is indicated on the right of the row. For example, the numbers of "black" dots in the first, second and third rows in the left area LA respectively are "0", "2" and "6".

Next, the counted numbers of "black" dots are successively accumulated from the first row for each of the right and left areas RA and LA, and a center value is obtained by dividing the accumulated value by 2. Then, those rows in which the counted number of "black" dots exceeds the center value are obtained.

In FIG. 17, the center value for the left area LA is $(0+2+6+7+8+5)/2=14$, and the counted number of "black" dots exceeds this center value "14" in the fourth row $y_4$ within the left area LA.

On the other hand, the center value for the right area RA is $(2+7+6+8+6+0)/2=14.5$, and the counted number of "black" dots exceeds this center value "14.5" in the third row $y_3$ within the right area RA.

Figure 18:
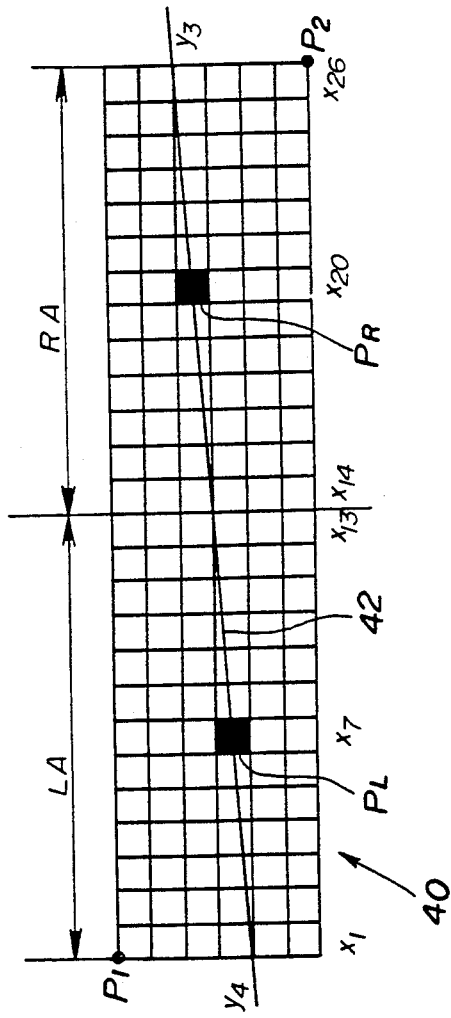

Then, as shown in FIG. 18, a dot $P_L$ where the center column $x_7$ and the center row $y_4$ in the left area LA intersect and a dot $P_R$ where the center column $x_{20}$ and the center row $y_3$ in the right area RA intersect are obtained. These two dots $P_L$ and $P_R$ are considered as centers of gravity of the respective left and right areas LA and RA. A straight line 42 which passes the center of gravity of the left area LA and the center of gravity of the right area RA is set as the reference line.

Next, a description will be given of a method of processing an inappropriate reference line when a straight line is thin (or unclear) and broken in part when setting the reference line by use of the straight line within the displayed image as described above.

In this case, isolated bits which is not adjacent to any of the top, bottom, right and left of the graphic are erased. Outer peripheral bits are increased so as to surround the graphic, and a noise elimination process is carried out to fill the internal empty portion. Thereafter, the center of gravity is obtained for each of the right and left areas in a similar manner to the above described. A straight line which passes the two centers of gravity of the right and left areas is set as the reference line, and the accuracy of this setting is improved over the method described above.

Figure 19:
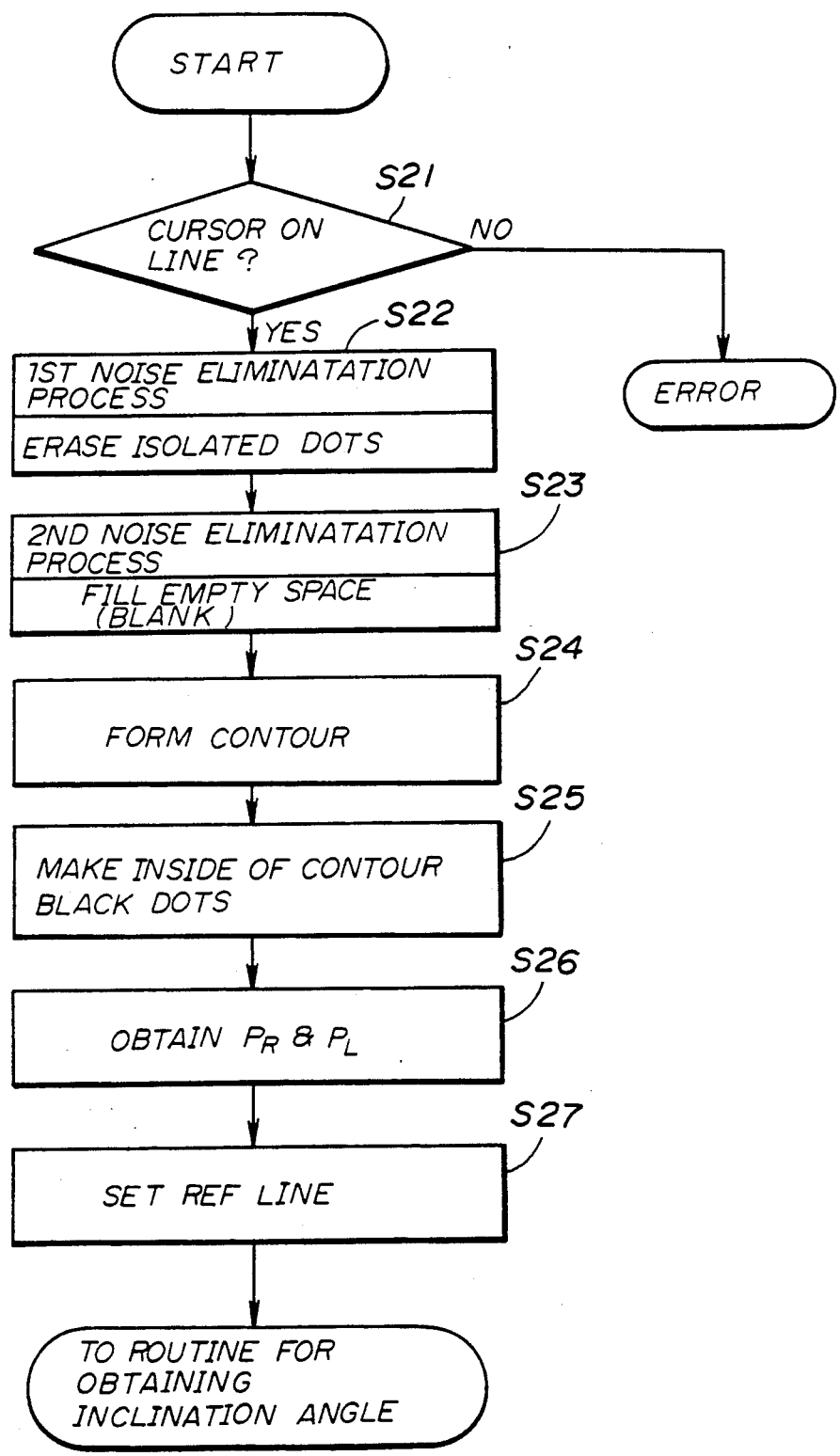
FIG. 19 is a flow chart for explaining a noise elimination process when designating a straight line on the display screen as the reference line.

This method will now be described by referring to a flow chart shown in FIG. 19 and the subsequent drawings. In FIG. 19, a step S21 discriminates whether or not the mouse cursor is on a line. When the discrimination result in the step S2 is NO, an error display is made and the process is ended. On the other hand, when the discrimination result in the step S21 is YES, the process advances to a step S22.

Figure 20:
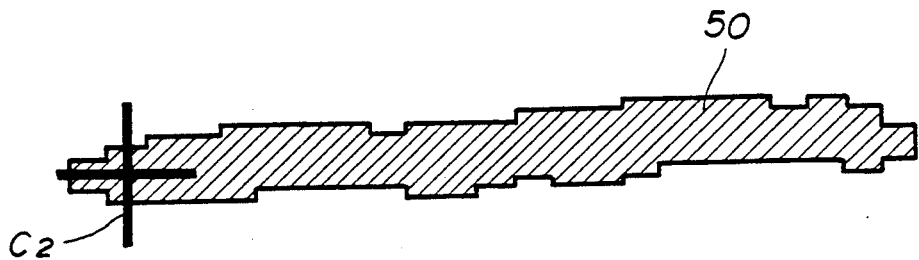
FIGS. 20 through 24 respectively are diagrams for explaining the noise elimination process.

FIG. 20 shows on an enlarged scale a case where the mouse cursor C2 is on a line 50. In this case, the discrimination result in the step S21 is YES and the process advances to the step S22.

Figure 21:
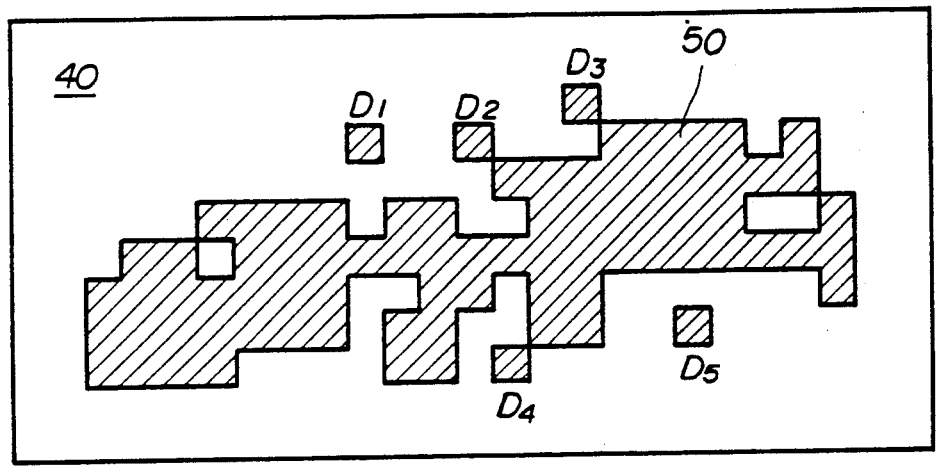

The step S22 carries out a first noise elimination process. That is, as shown on a further enlarged scale in FIG. 21, isolated dots D1 through D5 on the top, bottom, right and left of one dot on the line 50 are erased in an area within a range of approximately two times the lengths of the top, bottom, right and left sides of the line 50. For example, each dot is checked with a $3 \times 3$ dot matrix, and the center dot within the dot matrix is considered as "0" when the dots on the top, bottom, right and left of the center dot are "0".

Figure 22:
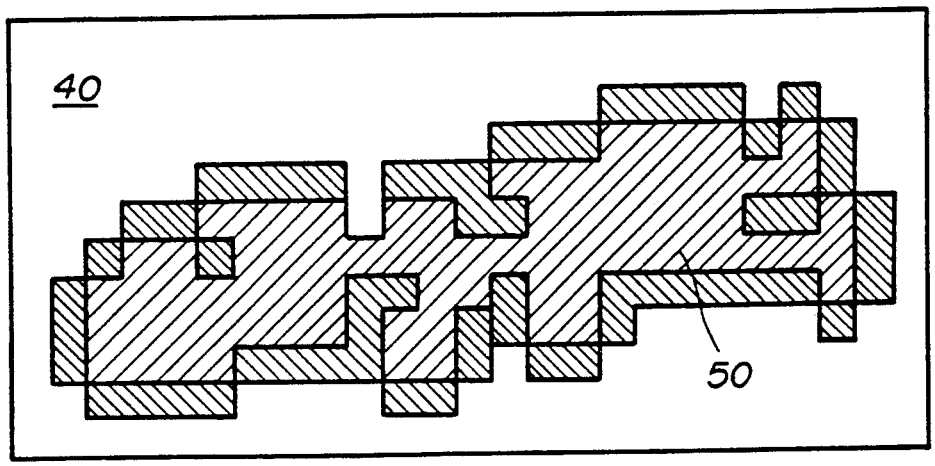

A step S23 carries out a second noise elimination process. That is, the line 50 is thickened by one dot to the top, bottom, right and left of the line 50 so as to fill in the empty spaces as shown in FIG. 22.

Figure 23:
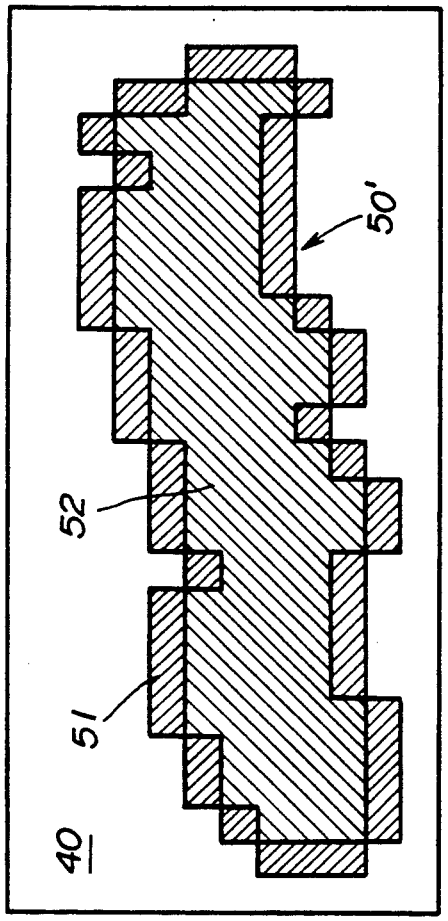

Next, a step S24 forms a contour 51 by surrounding the outer periphery of a thickened line 50' as shown in FIG. 23. For example, each dot is checked with a $3 \times 3$ dot matrix, and the center dot is considered as "1" only when the center dot is "1" and the dots to the top, bottom, right and left satisfy one of the following conditions.

i) The left dot is "0" and the right dot is "1".
ii) The right dot is "0" and the left dot is "1".
iii) The top dot is "0" and the bottom dot is "1".
iv) The bottom dot is "0" and the top dot is "1".

A step S25 sets all of the dots within an inside 52 of the contour 51 black (that is, "1").

Figure 24:
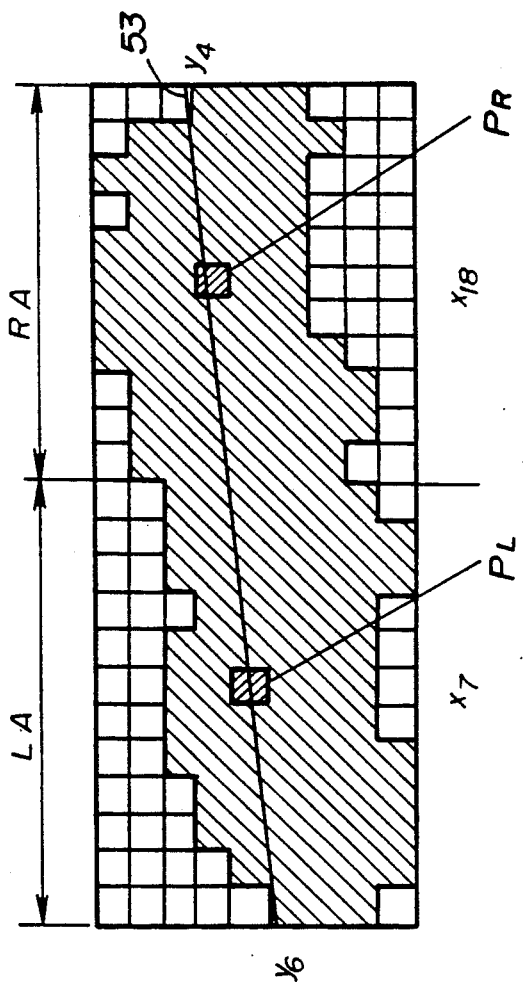

Thereafter, a step S26 divides the area 40 into the right area RA and the left area LA as shown in FIG. 24, and the centers of gravity along the y axis are obtained for each of the right and left areas RA and LA in a manner similar to the above described. In FIG. 24, the center of gravity of the left area LA is located in the row $y_6$ and the center of gravity of the right area RA is located in the row $y_4$.

A step S27 obtains the coordinates of the left center of gravity $P_L$ and the right center of gravity $P_R$ and sets a straight line 53 which passes these centers of gravity $P_L$ and $P_R$ as the reference line. After the step S27, the process advances to the above described routine for obtaining the inclination angle.

According to each of the methods described heretofore, the reference line is set automatically when the operator designates one or two points on the display screen. The operation of setting the reference line is simple and the accuracy of the set reference line is extremely satisfactory.

In the description given heretofore, the point data is entered by use of the mouse. However, it is of course possible to use the keyboard for entering the point data.

Further, the present invention is not limited to these embodiments, but various variations and modifications may be made without departing from the scope of the present invention.

WHAT IS CLAIMED IS

1. An image processing system comprising:
    memory means for storing an input image data in a bit map;
    display means coupled to said memory means for displaying an image which is described by the input image data;
    input means for inputting a point data for designating a straight line as a reference line in the image which is displayed on said display means;
    calculation means coupled to said input means for calculating an inclination angle of the reference line with respect to an axis of a rectangular coordinate of the bit map; and
    rotation means coupled to said calculation means for rotating the input image data stored in said memory means in the bit map so that the inclination angle becomes approximately zero.

2. The image processing system as claimed in claim 1 wherein said input means inputs a point data for designating as the reference line a straight line which exists in the image which is displayed on said display means and extends in a direction parallel or perpendicular to a character string in the image which is displayed.

3. The image processing system as claimed in claim 1 wherein said input means inputs a point data for drawing as the reference line a straight line which underlines a character string in the image which is displayed on said display means.

4. The image processing system as claimed in claim 1 wherein said calculation means calculates inclination angles of the reference line with respect to both horizontal and vertical axes of the rectangular coordinate of the bit map and supplies to said rotation means a smaller one of the calculated inclination angles as the inclination angle of the reference line.

5. The image processing system as claimed in claim 1 wherein said rotation means rotates the input image data stored in said memory means in the bit map clockwise when the reference line is a leftwardly declining line and counterclockwise when the reference line is a rightwardly declining line.

6. The image processing system as claimed in claim 1 wherein said input means comprises means for designating by the point data a rectangular area which includes a character string in the image which is displayed on said display means, means for determining a position of a first black dot from a top of the rectangular area for each of a plurality of columns of dots making up the rectangular area, means for independently determining a rounded average position of the first black dot for right and left halves of the rectangular area, means for independently determining an average point which is located at the rounded average position in a center column of each half for the right and left halves of the rectangular area, and means for setting as the reference line a straight line which passes both average points in the right and left halves of the rectangular area.

7. The image processing system as claimed in claim 1 wherein said input means comprises means for designating by the point data a rectangular area which includes a character string in the image which is displayed on said display means, means for independently determining a center value of numbers of black dots in each of a plurality of rows for right and left halves of the rectangular area, means for independently determining a certain row in which the number of black dots exceeds the center value for the right and left halves of the rectangular area, means for independently determining a center of gravity of each half where the certain row intersects a center column out of a plurality of columns in each half for the right and left halves of the rectangular area, and means for setting as the reference line a straight line which passes both centers of gravity in the right and left halves of the rectangular area.

8. The image processing system as claimed in claim 1 wherein said input means comprises means for designating by the point data a rectangular area which includes a character string in the image which is displayed on said display means, means for eliminating a noise in the character string by eliminating and adding black dots, means for independently determining a center value of numbers of black dots in each of a plurality of rows for right and left halves of the rectangular area, means for independently determining a certain row in which the number of black dots exceeds the center value for the right and left halves of the rectangular area, means for independently determining a center of gravity of each half where the certain row intersects a center column out of a plurality of columns in each half for the right and left halves of the rectangular area, and means for setting as the reference line a straight line which passes both centers of gravity in the right and left halves of the rectangular area.

9. An image processing system comprising:
    first memory means for storing in a bit map an input image data of an image in a full size of the image;
    compression means coupled to said first memory means for compressing the input image data into compressed image data;
    second memory means coupled to said compression means for storing the compressed image data in a bit map;
    display means coupled to said first and second memory means for displaying an image which is described by the compressed image data in a first mode and for displaying the image which is described by the input image data in a second mode;
    first input means for inputting a point data for designating a straight line as a reference line in the image which is displayed on said display means in the first mode;
    calculation means coupled to said first input means for calculating an inclination angle of the reference line with respect to an axis of a rectangular coordinate of the bit map;
    rotation means coupled to said calculation means for rotating the compressed image data stored in said second memory means in the bit map in the first mode so that the inclination angle becomes approximately zero and for rotating the input image data stored in said first memory means in the bit map in the second mode so that the inclination angle becomes approximately zero; and
    second input means for designating the second mode so as to rotate the image which is described by the input image data based on the image which is displayed on said display means in the first mode.

10. The image processing system as claimed in claim 9 wherein said first input means inputs a point data for designating as the reference line a straight line which exists in the image which is displayed on said display means and extends in a direction parallel or perpendicular to a character string in the image which is displayed in the first mode.

11. The image processing system as claimed in claim 9 wherein said first input means inputs a point data for drawing as the reference line a straight line which underlines a character string in the image which is displayed on said display means in the first mode.

12. The image processing system as claimed in claim 9 wherein said calculation means calculates inclination angles of the reference line with respect to both horizontal and vertical axes of the rectangular coordinate of the bit map and supplies to said rotation means a smaller one of the calculated inclination angles as the inclination angle of the reference line.

13. The image processing system as claimed in claim 9 wherein said rotation means rotates the input image data stored in said first memory means in the bit map clockwise when the reference line is a leftwardly declining line and counterclockwise when the reference line is a rightwardly declining line.

14. The image processing system as claimed in claim 9 wherein said first input means comprises means for designating by the point data a rectangular area which includes a character string in the image which is displayed on said display means in the first mode, means for determining a position of a first black dot from a top of the rectangular area for each of a plurality of columns of dots making up the rectangular area, means for independently determining a rounded average position of the first black dot for right and left halves of the rectangular area, means for independently determining an average point which is located at the rounded average position in a center column of each half for the right and left halves of the rectangular area, and means for setting as the reference line a straight line which passes both average points in the right and left halves of the rectangular area.

15. The image processing system as claimed in claim 9 wherein said first input means comprises means for designating by the point data a rectangular area which includes a character string in the image which is displayed on said display means in the first mode, means for independently determining a center value of numbers of black dots in each of a plurality of rows for right and left halves of the rectangular area, means for independently determining a certain row in which the number of black dots exceeds the center value for the right and left halves of the rectangular area, means for independently determining a center of gravity of each half where the certain row intersects a center column out of a plurality of columns in each half for the right and left halves of the rectangular area, and means for setting as the reference line a straight line which passes both centers of gravity in the right and left halves of the rectangular area.

16. The image processing system as claimed in claim 9 wherein said first input means comprises means for designating by the point data a rectangular area which includes a character string in the image which is displayed on said display means in the first mode, means for eliminating a noise in the character string by eliminating and adding black dots, means for independently determining a center value of numbers of black dots in each of a plurality of rows for right and left halves of the rectangular area, means for independently determining a certain row in which the number of black dots exceeds the center value for the right and left halves of the rectangular area, means for independently determining a center of gravity of each half where the certain row intersects a center column out of a plurality of columns in each half for the right and left halves of the rectangular area, and means for setting as the reference line a straight line which passes both centers of gravity in the right and left halves of the rectangular area.

* * * * *